United States Patent
Miles et al.

(10) Patent No.: US 9,645,274 B2
(45) Date of Patent: May 9, 2017

(54) AIRBORNE ELECTROMAGNETIC SYSTEM WITH RIGID LOOP STRUCTURE COMPRISED OF LIGHTWEIGHT MODULAR NON-ROTATIONAL FRAMES

(71) Applicant: CGG DATA SERVICES AG, Zug (CH)

(72) Inventors: John Philip Miles, Oakville (CA); William Wallace Marr, St. Catharines (CA)

(73) Assignee: CGG DATA SERVICES AG, Zug (CH)

( * ) Notice: Subject to any disclaimer, the term of this patent is extended or adjusted under 35 U.S.C. 154(b) by 198 days.

(21) Appl. No.: 14/356,746

(22) PCT Filed: Nov. 8, 2012

(86) PCT No.: PCT/CA2012/001029
§ 371 (c)(1),
(2) Date: May 7, 2014

(87) PCT Pub. No.: WO2013/067624
PCT Pub. Date: May 16, 2013

(65) Prior Publication Data
US 2015/0015263 A1    Jan. 15, 2015

Related U.S. Application Data

(60) Provisional application No. 61/556,980, filed on Nov. 8, 2011.

(51) Int. Cl.
*G01V 3/16*    (2006.01)
*G01V 3/165*   (2006.01)
*G01V 3/08*    (2006.01)

(52) U.S. Cl.
CPC .............. *G01V 3/083* (2013.01); *G01V 3/165* (2013.01); *G01V 2003/084* (2013.01)

(58) Field of Classification Search
CPC ....................................................... G01V 3/165
(Continued)

(56) References Cited

U.S. PATENT DOCUMENTS 4,628,266 A † 12/1986 Dzwinel
2008/0246484 A1 † 10/2008 Miles

FOREIGN PATENT DOCUMENTS

WO    2004/046761 A1    6/2004
WO    2004046761 A1 †   6/2004
(Continued)

OTHER PUBLICATIONS

Office Action and Search Report in corresponding Australian Application No. 2012334757 dated May 15, 2015.
(Continued)

*Primary Examiner* — Bot Ledynh
(74) *Attorney, Agent, or Firm* — Patent Portfolio Builders PLLC

(57) ABSTRACT

The present invention provides a light weight, modular and rigid structure for supporting the transmitter loop of an airborne electromagnetic system. The airborne electromagnetic surveying system comprises a tow assembly connected to an aircraft, the tow assembly including a transmitter section comprising a transmitter coil for generating a primary electromagnetic field that induces a secondary electromagnetic field. The transmitter coil is supported by a generally rigid transmitter frame. The transmitter frame comprises a plurality of frame sections assembled in a way such that the generally rigid transmitter frame substantially retains a rigid shape during operation. The system may also include a receiver section located above the generally rigid
(Continued)

transmitter frame in between the aircraft and the generally rigid transmitter frame for detecting the secondary electromagnetic field.

10 Claims, 10 Drawing Sheets

(58) Field of Classification Search
USPC .......................................... 324/330–331, 365
See application file for complete search history.

(56) References Cited

FOREIGN PATENT DOCUMENTS

| WO | 2009/105873 | A1 | | 9/2009 |
|----|-------------|----|---|--------|
| WO | 2009105873 | A1 | † | 9/2009 |
| WO | 2011047472 | A1 | | 4/2011 |

OTHER PUBLICATIONS

International Search Report issued in related application No. PCT/CA2012/001029 and mailed on Feb. 11, 2013.
Third Party Observation submitted Mar. 7, 2014 in related International Application No. PCT/CA2012/001029.
Arhus Stiftidende Article, "Hvad laver denne helicopter?" (Translation: "What is this helicopter doing?"), 1 page, Jun. 21, 2011.†
Danish TV-channel TV2 Ostjylland, Eastern Jutland today, Mysterious Helicopter, Jun. 21, 2011, 5 pages, url: http://www.tv2oj.dk/arkiv/2011/6/21?video_id=20295&autoplay=1.†
Anders Vest Christiansen, et al., "The transient electromagnetic method," Groundwater Geophysics, Chapter 6, pp. 179-225, 2006.†
Annika Steuer, et al., "A comparison of helicopter-borne electromagnetics in frequency-and time-domain at the Cuxhaven valley in Northern Germany", pp. 194-205, 2009, Journal of Applied Geophysics, Elsevier.†
Esben Auken, et al., "An integrated processing scheme for high-resolution airborne electromagnetic surveys, the SkyTEM system", Exploration Geophysics, 2009, pp. 184-192, CSIRO Publishing.†

† cited by third party

AIRBORNE ELECTROMAGNETIC SYSTEM WITH RIGID LOOP STRUCTURE COMPRISED OF LIGHTWEIGHT MODULAR NON-ROTATIONAL FRAMES

FIELD OF THE INVENTION

The present invention relates generally to an airborne electromagnetic system with rigid loop structure in geological mapping and surveying.

BACKGROUND OF THE INVENTION

Various systems using electromagnetic ("EM") techniques have been known in the field of airborne subsurface geophysical surveying.

EM systems may come in various shapes and sizes, but they generally involve a source of electromagnetic energy (transmitter) and a receiver to detect the response of the ground. Generally speaking, geophysical EM methods involve the generation of a magnetic field by applying a periodic current to a transmitter coil system placed near the surface of the earth. This primary magnetic field induces electrical currents in the ground, and the secondary magnetic field produced by these currents is measured to provide information regarding ground conductivity distributions. By processing and interpreting the received signals, it is possible to make deduction about the distribution of conductivity in the subsurface.

A single or multi-turn loop is generally used as the transmitter element of EM systems. A time varying current passing through the loop can be used to create a time varying magnetic field. One or more receiver coils may be used to measure the response along perpendicular axes.

EM measurements can be done either in frequency domain or time domain. A frequency domain (FD) EM system transmits a magnetic field signal at a single frequency with sinusoidal variation in amplitude. The response can either be described by its total amplitude and phase with respect to the transmitter signal or by the amplitudes of components in-phase ("in-phase") and 90° out of phase ("quadrature") with respect to the transmitter signal. In time-domain (TD) EM systems, a pulse of current may be applied to the transmitter coil during an on-period, generating the primary or transmitted EM field, and then switched off during an off period. The secondary signal may be measured at the receiver coil as a function of time. The signal amplitude decay during the off-period, combined with modeling of the conductivity and geometry of geological bodies in the ground, may be utilized to provide conductivity contour maps.

EM methods can encompass both ground-based and airborne applications using airplanes and helicopters, etc.

In designing a helicopter mounted TDEM system, there are a number of desired features, for example, inter alia, high signal-to-noise ratio, high conductance discrimination, and high spatial resolution.

High signal-to-noise ratio can be accomplished by lowering system noise, and/or increasing the signal at the receiver coil. One method of increasing the signal is to increase the primary magnetic field. Stronger transmitter signal power, which can be generally obtained by using transmitter loops with large diameters, also assists in obtaining increased signal-to-noise ratio and greater penetration. One method of reducing or limiting noise is to reduce as much as possible the movement of the receiver relative to the transmitter. For example, rigid structures can be used to support and connect the transmitter and the receiver of an EM system.

In practice, however, the expected benefit of using a large transmitter loop can be difficult to obtain due to the non-rigidity or over-flexibility of the large transmitter loop structure, which distorts the shape of the transmitter loop during flight and the resulting primary magnetic field during airborne operation which in turn resulting in increased system noise. Therefore, the stabilization of the transmitter loop will provide less distortion of the receiver itself and better signal-to-noise ratio.

The increased weight and size associated with a large transmitter loop also impose mechanical challenges that impede the speed, reduce aerodynamics, and increase drag.

At the same time, using rigid structures existing in the prior art to couple the transmitter and the receiver, however, will increase the weight of the EM system, and therefore resulting in a heavy weight structure and increase the cost of survey operations. For example, it will be a mechanical challenge and may not be economical or practical for a helicopter to tow a transmitter weighing over 500 kg.

As a result, existing EM systems have not been able to satisfactorily take advantage of large transmitter loops. For example, AeroTEM II™ system is an airborne EM system having a rigid transmitter loop and a receiving coil that is mounted at the center of the transmitting loop. The transmitter and the receiver of the AeroTEM II™ system are supported and connected to each other using heavy rigid structures which limit its transmitter loop diameter to about 5 meter in order to have a manageable overall weight of the structure and not exceed tow capacity.

Another existing EM system described in Canadian Patent Application No. 2,702,346 proposed a large transmitter loop, where the polygonal receiver coil sits at the centre of the transmitter coil frame. However, the proposed transmitter loop has multiple "articulating joints" and is very flexible as it allows rotation of the frames relative to each other at the "articling joints" and as a result the structure can bend at a plurality of locations about a circumference of the transmitter loop. Therefore, none of these prior art EM systems provide a transmitter loop the size of which can be easily increased while maintaining the overall stability of the loop.

Therefore, there remains a need for an airborne EM system having a rigid supported transmitter loop that will maintain its stability as the size of the transmitter loop varies.

SUMMARY OF THE INVENTION

The present invention overcomes the above drawbacks of the prior art EM systems by providing a modular, light weight and rigid structure for supporting the transmitter loop of an airborne EM system.

In accordance with one aspect of the present invention, there is provided an airborne electromagnetic surveying system comprising: (a) a tow assembly connected to an aircraft, the tow assembly further comprising (i) a transmitter section comprising: a transmitter means for generating a primary electromagnetic field that induces a secondary electromagnetic field, a generally rigid transmitter frame for supporting the transmitter means, the transmitter frame comprising a plurality of fixedly connected frame sections assembled in a way such that the generally rigid transmitter frame substantially retains its shape during operation; and (ii) a receiver section for detecting the secondary electromagnetic field.

In accordance with another aspect of the present invention, there is provided a transmitter section for an airborne electromagnetic survey system, comprising: a transmitter means, and a generally rigid transmitter frame for supporting the transmitter means, the transmitter frame comprising a plurality of fixedly connected frame sections assembled in a way such that the generally rigid transmitter frame substantially retains its shape during operation.

In accordance with another aspect of the present invention, there is provided a tow assembly for an airborne electromagnetic surveying system, comprising: means for suspending a transmitter section from an aircraft, the transmitter section comprising: a transmitter means, and a generally rigid transmitter frame for supporting the transmitter means, the transmitter frame comprising a plurality of fixedly connected frame sections assembled in a way such that the generally rigid transmitter frame substantially retains its shape during operation.

Other features and advantages of the present invention will become apparent from the following detailed description and the accompanying drawings, which illustrate, by way of example, the principles of the invention.

BRIEF DESCRIPTION OF THE DRAWINGS

The invention will now be described by way of reference to the drawings, in which.

DETAILED DESCRIPTION OF THE INVENTION

Figure 1:
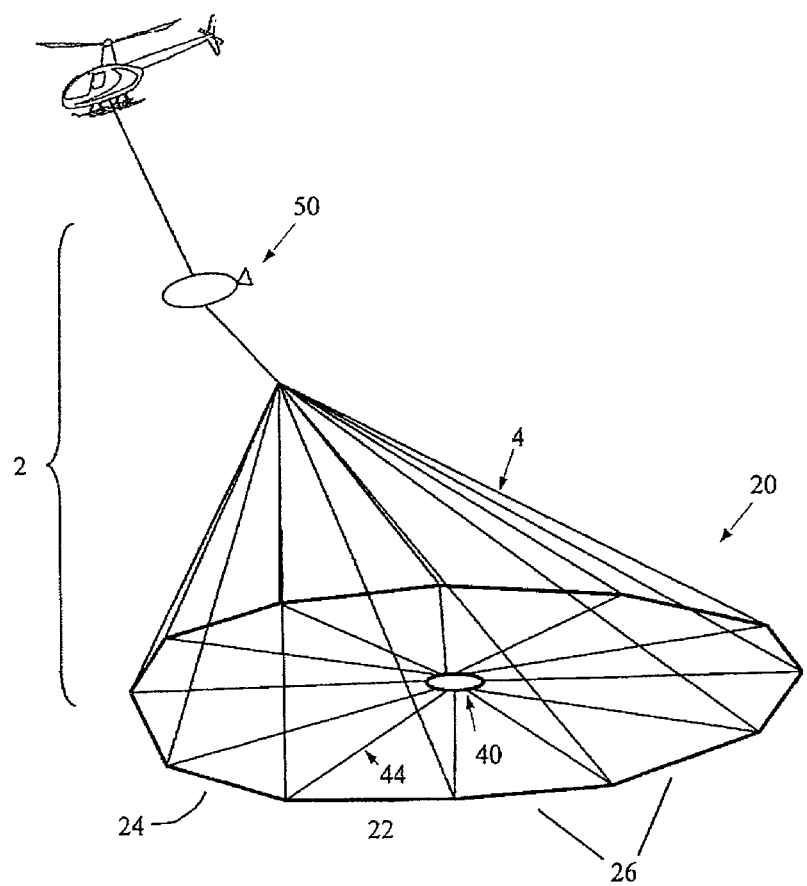
FIG. 1 is a schematic perspective view of an embodiment of the airborne EM system in an airborne position flying at surveying speeds.

Referring to FIG. 1, an example embodiment of the airborne electromagnetic surveying system described herein comprises a tow assembly 2 attached to an aircraft. The tow assembly 2 may comprise a transmitter section 20 and a receiver section 50.

The transmitter section 20 is a part of the EM system that generally includes one or more components associated with the task of generating a source electromagnetic field. In this regard, the transmitter section 20 comprises a transmitter means for generating a primary electromagnetic field that induces a secondary electromagnetic field in the ground. Various transmitter means may be used, for example, transmitter loop coils or loop wires 22. The transmitter loop coil 22 may take various shapes and sizes depending on the particulars of the surveys engaged in. While FIG. 1 illustrates a multi-turn polygonal transmitter loop coil 22 as an example, it is understood by a person skilled in the art that similar structure, for example, circular coil or coil of other shape can also be used.

The transmitter section 20 may further comprise a "generally rigid" transmitter frame 24 for supporting the transmitter coil 22. The loop structure or transmitter frame is "generally rigid" in the sense that the loop structure is rigid, other than the mechanical flex caused by the weight of the components, as opposed to flex caused by the rotation between the frame members.

Preferably, the transmitter frame 24 comprises a tubular portion or an enclosure that internally houses the transmitter coil 22. In FIG. 1, the transmitter coil 22 is enclosed within the transmitter frame 24 and therefore is not directly visible. Alternatively, the transmitter coil 22 can be mounted to the transmitter frame 24 or supported thereon in any manner that is known in the art.

The transmitter frame 24 is modular and comprises a plurality of fixedly connected frame sections 26, forming a substantially circular or polygonal loop. This allows the shape of the transmitter frame 24 to be easily configured for supporting transmitter coils 22 with various shapes. In addition, the modularity of the transmitter frame 24 allows for easy adjustment of the size of the transmitter frame to accommodate or support transmitter coils 22 of various sizes.

Preferably, the plurality of frame sections 26 are serially and fixedly connected one to another forming a transmitter loop frame 24 as illustrated in FIG. 1. However, in some embodiments according to the present disclosure, the transmitter coil 22 may not be planar and may comprise a 3-dimensional transmitter (such as a cube) generating primary electromagnetic fields in multiple directions. For example, such multi-direction transmission may be used in prospecting along the sides of hills and/or the floor of valleys. As such, in some embodiments, the transmitter loop frame 24 may be non-planar.

Each frame section 26 is made of generally rigid materials. For example, materials such as carbon fiber reinforced plastic, carbon fiber reinforced polymer, unplasticized polyvinyl chloride (uPVC), wood/plastic composite, or any other composite or materials that provide strong rigidity, stability and resistance to deformation, can be used to construct frame sections 26 or portions thereof. Preferably, lightweight materials are used for constructing frame sections 26 or transmitter frame 24 to allow for constructing sizable transmitter frame without significantly increasing the weight thereof.

Advantageously, using rigid materials constructing the transmitter frame 24 allows its size to be increased while maintaining its overall stability and structural integrity.

In comparison, if semi-rigid or flexible materials are used, or that when flexible or rotating joints are engaged, the transmitter frame may become overly-flexible as the size increases due to the increased weight of the frame. The undesirable floppiness or flexibility would result in the distortion of the shape of the transmitter loop during flight and would frustrate the goal of achieving low system noise.

In order to provide a generally rigid transmitter frame 24 which minimizes structure distortion during flight, the frame sections 26 are fixedly connected in a manner that substantially eliminates the relative rotation between the connected frame sections 26, thereby allowing the transmitter frame 24 to retain its shape during operation, or preventing distortion of the shape of the transmitter frame 24. Various connecting means are provided in accordance with the example embodiments of present invention described herein.

Figure 2:
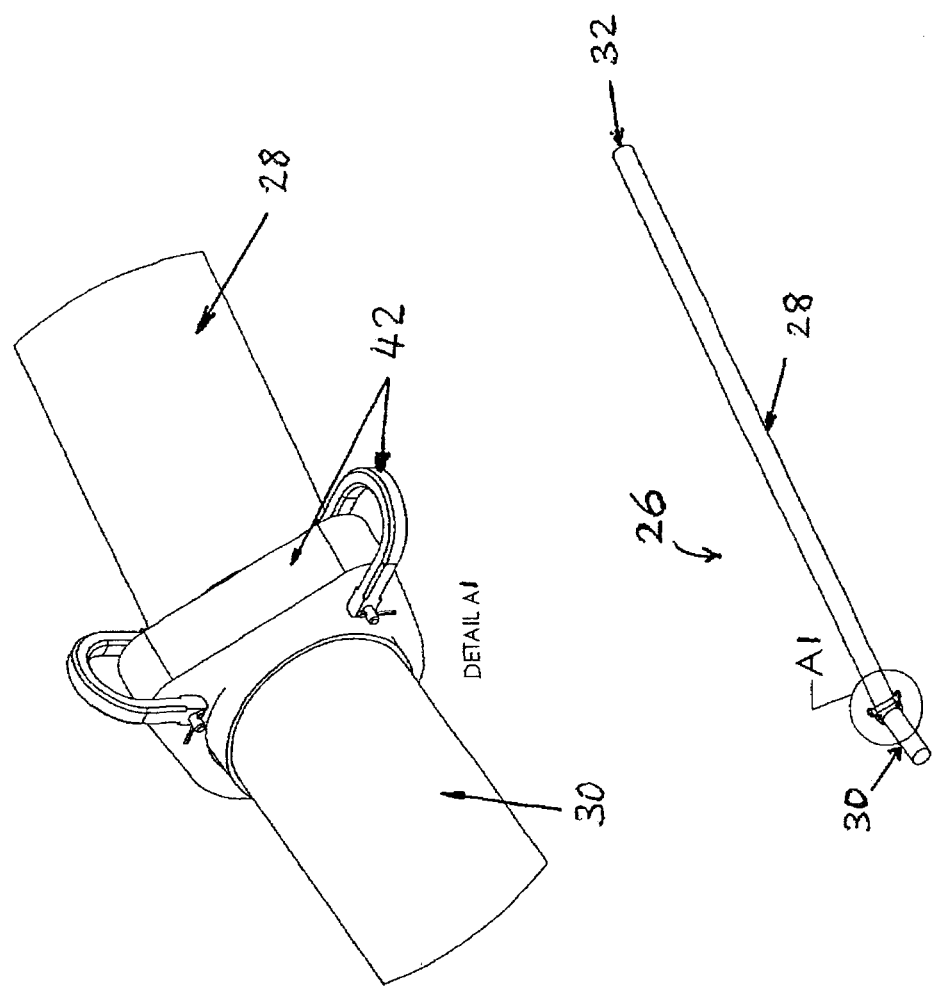
FIG. 2 is a perspective view of a frame section of the transmitter frame according to an embodiment of the airborne EM system.
Figure 3:
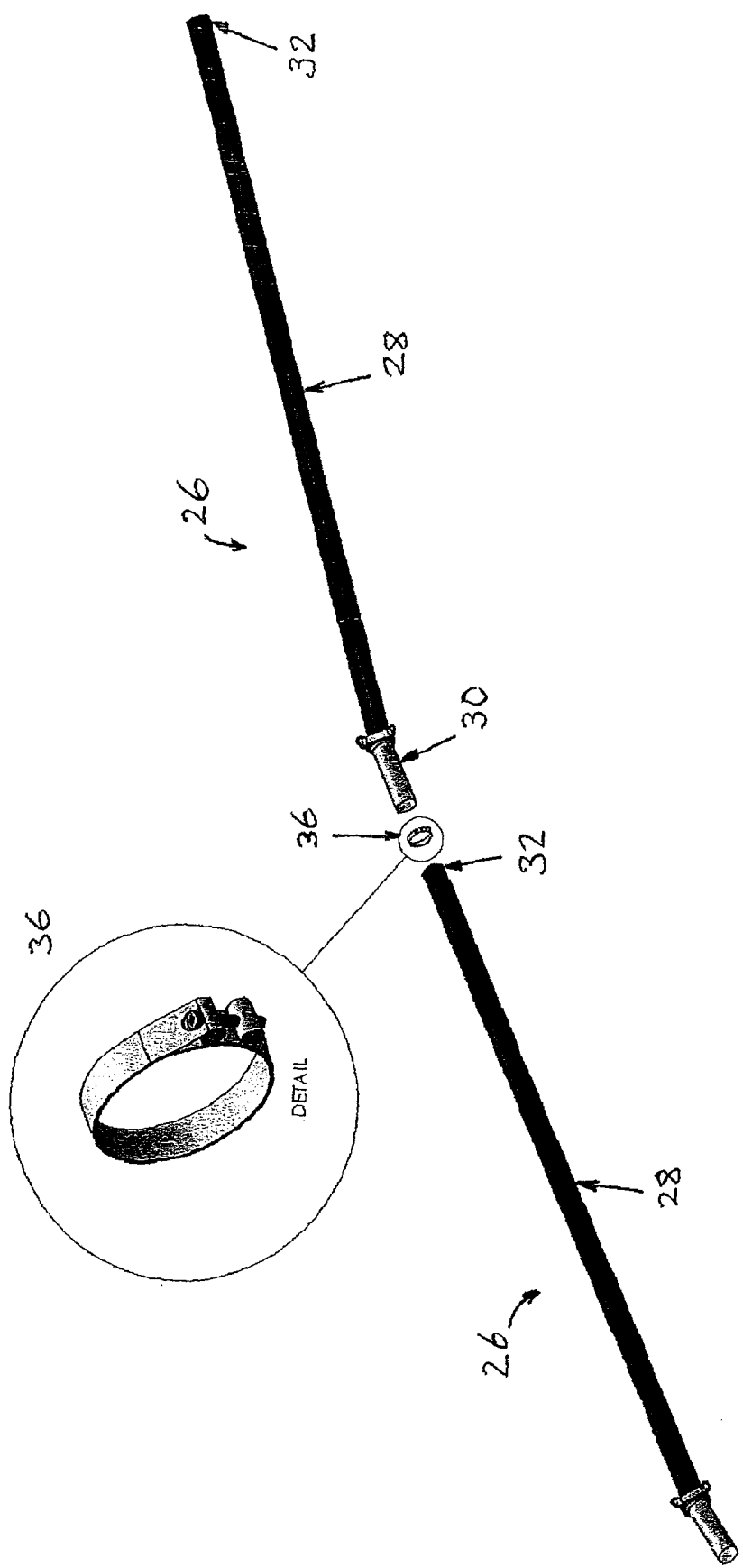
FIG. 3 is an exploded view of two disassembled frame sections and a fastening means according to an embodiment of the airborne EM system.
Figure 4:
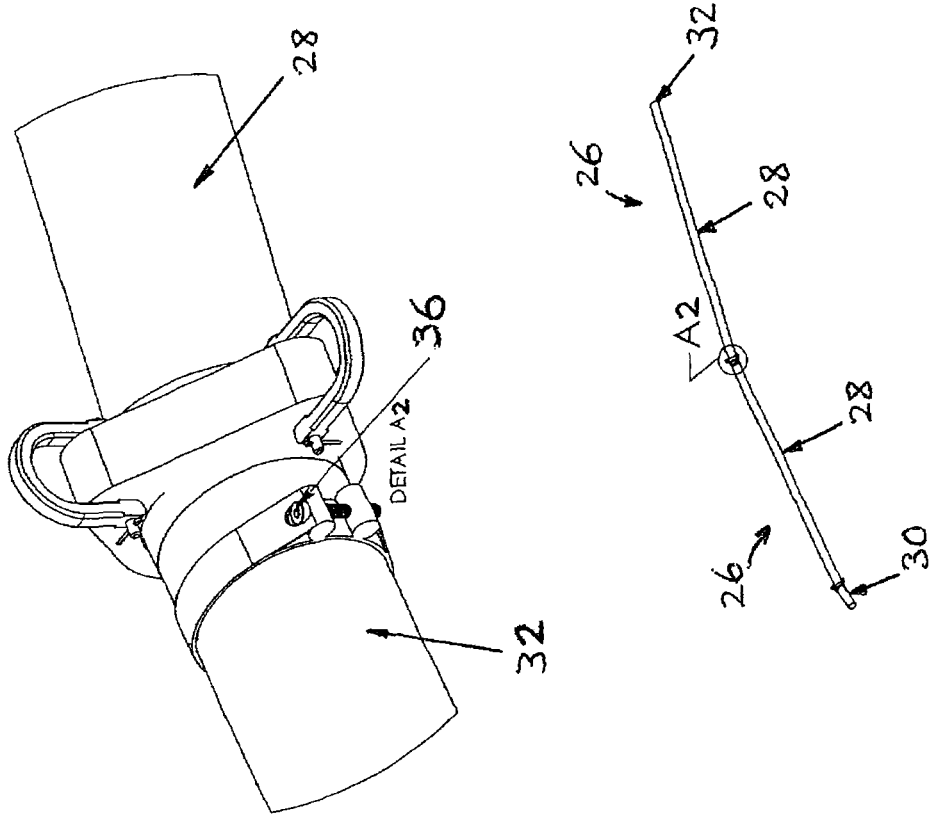
FIG. 4 is a perspective view of two frame sections assembled by a fastening means according to an embodiment of the airborne EM system.

Referring to FIGS. 2 to 4, a frame section 26 comprises a substantially elongated section 28 and at least one connecting section 30 disposed at the ends of the elongated section 28.

In some embodiments, a connecting section 30 is disposed at each of the ends of the elongated section 28. The elongated sections 28, when connected using connecting sections 30, collectively define a perimeter of the transmitter frame 24 and therefore substantially define the shape and size of transmitter frame 24.

The connecting sections 30 are used to provide modular assembling and disassembling of the transmitter frame 24 and to provide suspension or connection locations for other components of the tow assembly 2. For example, as shown in FIGS. 1 and 2, connector means 42 (for example, tow rings) can be mounted around connecting sections 30 for towing the transmitter frame 24 using tow ropes 4, or for connecting the transmitter driver 40 using cross connecting means such as ropes 44.

Preferably, the elongated section 28 and the connecting section 30 are constructed using the same or similar rigid materials for constructing the frame section 26. They can also be constructed using different types of rigid materials noted above to provide alternative overall weight and strength/rigidity balancing of the transmitter frame 24.

Different types of frame sections are provided in the embodiment illustrated in FIGS. 2 to 4. Some frame sections 26 may include at least one connecting section 30 that is constructed as an extension extending from one end of the elongated section 28 and along the length of the elongated section 28. In this type of frame sections 26, the elongated section 28 and the connecting section 30 are substantially co-axial.

Other embodiments of frame sections include, for example, at least one connecting section 30 extending from one end of the elongated section 28 and being offset from the length of the elongated section 28. In this type of frame sections 26, the elongated section 28 and the connecting section 30 are angularly disposed forming an elbow around the connecting section 30.

Still further, other embodiments of frame sections 26 may comprise at least one non-extruding receiving end 32 that can receive a corresponding extruding connecting section 30.

A plurality of the frame sections as described herein can be serially and fixedly connected to form longer, combined frame sections 26 and/or a larger transmitter frame 24. Serial connection can be achieved by inserting a connecting section 30 of a first frame section 26 into a corresponding receiving end 32 of a second frame section 26. The cross-sections of the connecting sections 30 and the receiving ends 32 preferably are constructed so that they fit tightly with each other with substantially no observable relative movement therebetween.

Alternatively, frame sections 26 can be connected by fixedly coupling the connecting sections 30 and/or the receiving ends 32 of the frame sections 26. For example, the connecting sections 30 and/or the receiving ends 32 may be further coupled by screws.

Figure 5:
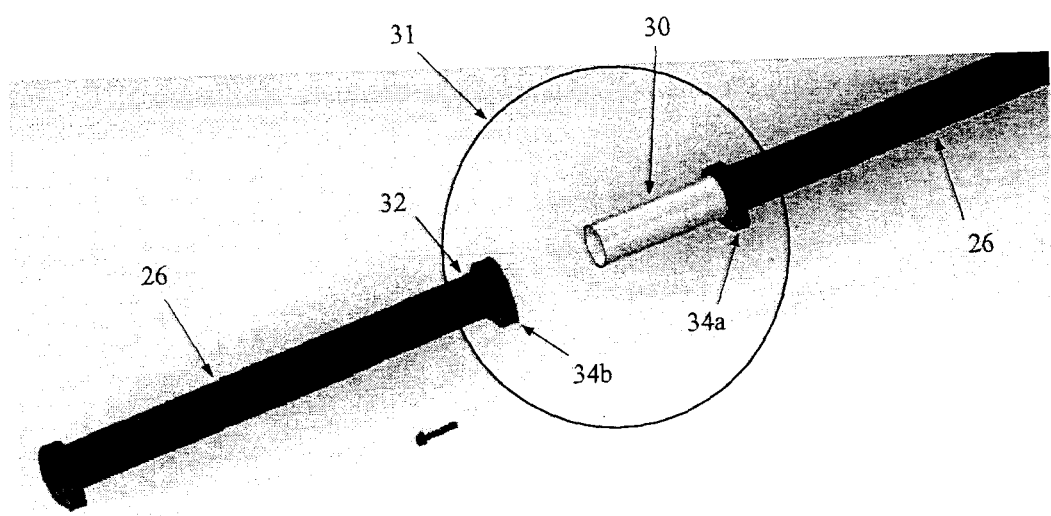
FIG. 5 is a perspective view of two disassembled frame sections according to an embodiment of the airborne EM system.
Figure 6:
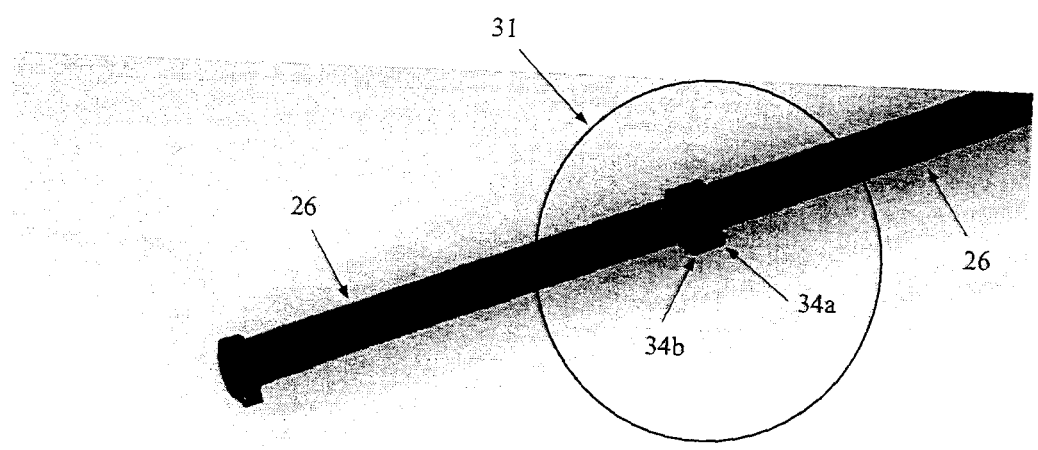
FIG. 6 is a perspective view of two assembled frame sections according to an embodiment of the airborne EM system.

Referring to FIGS. 5 and 6 and according to one embodiment of the airborne electromagnetic surveying system described herein, the transmitter frame 24 comprises at least one coupling portion 31 for assembling at least two adjacent frame sections 26 such that the shape of transmitter frame 24 is substantially free from distortion being bent during flight operations. For example, a coupling portion 31 comprises a first annular flange 34a disposed on a first frame section 26 and a second annular flange 34b disposed on a second frame section 26. The first flange 34a is disposed near a connecting section 30 of the first frame section 26, and the second flange 34b is disposed on a receiving end 32 of the second frame section 26, such that when the first and second frame sections 26 are connected, at least a portion of the first flange 34a is operable to be rigidly or fixedly coupled to at least a portion of the second flange 34b thereby assembling the first and second frame sections 26 in a way such that there is substantially no relative rotation between the connected frame sections 26, and that the transmitter frame 24 substantially retains a rigid shape during operation. As shown in FIGS. 5 and 6, flanges 34a and 34b can be coupled using screws, nuts/washers or other fastening devices. Preferably, the flanges 34a and 34b are constructed using the same or similar rigid materials as those used for the frame sections 26.

In one embodiment, to enhance the rigidity of frame sections 26 or transmitter frame 24, fastening means 36 are applied at the receiving ends 32 and the connecting sections 30 to rigidly or fixedly couple the connected frame sections 26. Using fastening means 36 ensures a rigid or fixed coupling between frame sections, thus minimizing joint rotation—or rotations between the connected frame sections 26 during take-off, landing, or survey operation.

Referring to FIGS. 3 and 4, clamps are used to substantially eliminate or minimize relative movements between the connecting sections 30 and the receiving ends 32 of the frame sections 26.

While not explicitly shown in the Figures, other fastening means can be used to achieve the rigid or fixed coupling between frame sections. For example, brackets, fasteners, rivets, screws, nuts/washers, clips, bolts, pins, locks, joints, and other rigid connection means may be used to enhance the overall rigidity of the transmitter frame 24. Preferably, the fastening means 36 are constructed using rigid and strong materials such as steels, metals or alloys.

Figure 7:
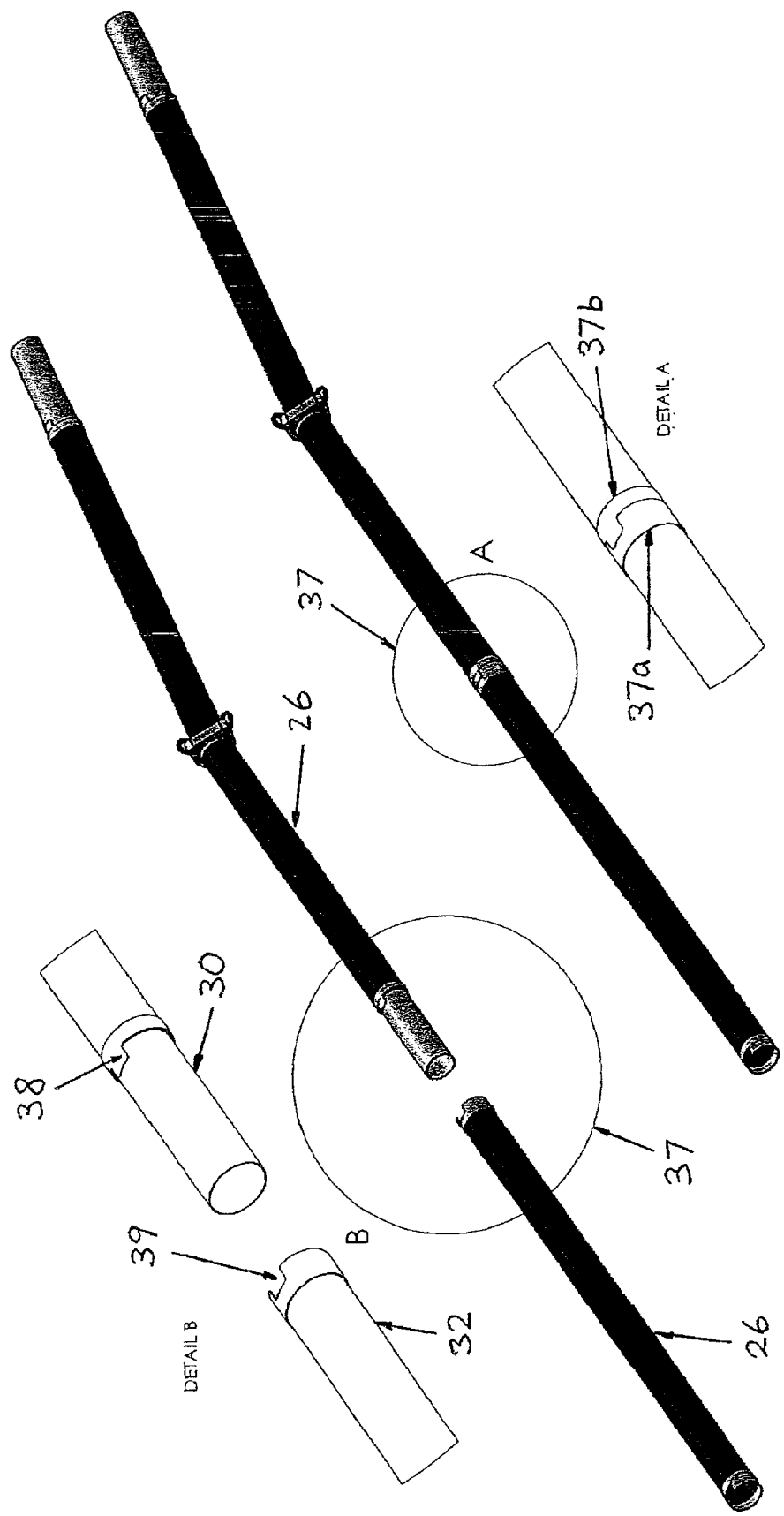
FIG. 7 is a perspective view of two frame sections assembled by an interlock according to an embodiment of the airborne EM system.
Figure 8:
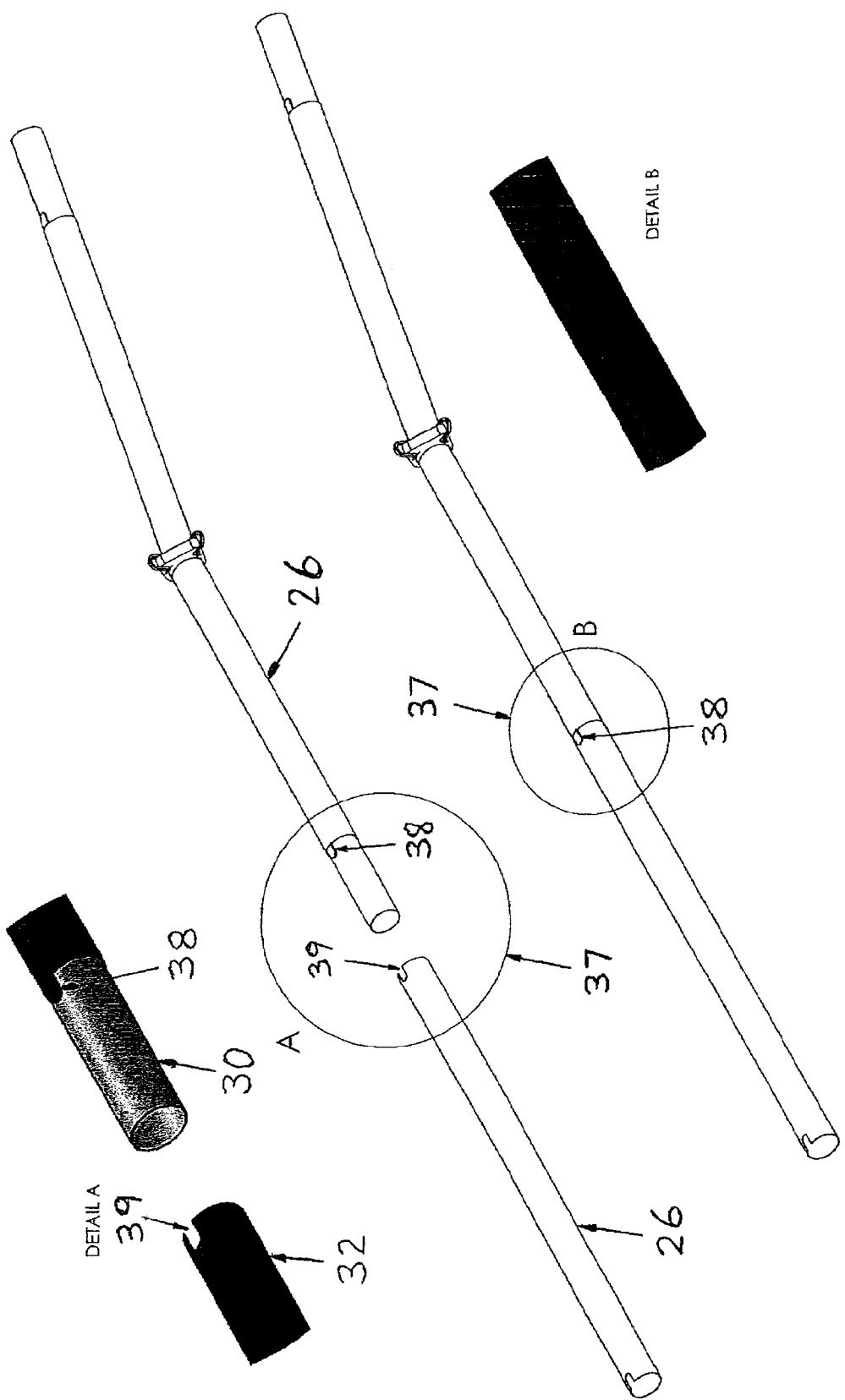
FIG. 8 is a perspective view of two frame sections assembled by an interlock according to an embodiment of the airborne EM system.

Referring to FIGS. 7 and 8 and according to one embodiment of the airborne electromagnetic surveying system described herein, the transmitter frame 24 comprises at least one interlock 37 for interlocking a plurality of adjacent frame sections 26. For example, at least two frame sections 26 may each comprise an interlocking member such that when the at least two frame sections 26 are connected, the interlocking members engage with each other to substantially eliminate relative movements or rotations between the connected frame sections 26.

In one embodiment, an interlock comprises at least one tab 38 disposed on a first frame section 26 and at least one slot 39 located on a second frame section 26, wherein when in a locking position the at least one tab 38 of the first frame section 26 extends into the at least one slot 39 of the second frame section 26. Such interlocking engagement between tabs 38 and slots 39 of frame sections 26 substantially eliminates or minimizes relative movements or rotations between the connected frame sections 26.

Preferably, the shape of a tab 38 substantially matches the shape defined by the corresponding slot 39.

Preferably, the interlocks are constructed using the same or similar rigid materials as those used for the frame sections 26.

Preferably, tabs 38 or slots 39 are disposed in proximity to the connecting section 30 or receiving end 32 of the frame section 26 such that the frame section 26 is interlocked with an adjacent frame section 26 while being serially connected thereto.

In the embodiment shown in FIG. 7, the interlock 37 comprises a pair of interlocking bands 37a and 37b rigidly fixed to the frame sections 26 and disposed near the connecting section 30 of the first frame section 26 and the receiving end 32 of the second frame section 26 respectively. When two adjacent frame sections 26 are connected, the at least one tab 38 extends into the at least one slot 39 so that bands 37a and 37b are interlocked with each other thereby minimizing relative movement and rotation between the frame sections 26.

In the embodiment shown in FIG. 8, the interlock 37 comprises at least one tab 38 extending from a first frame section 26 and at least one slot 39 formed on a second frame section 26. The at least one tab 38 is disposed near a connecting section 30 of the first frame section 26, and the at least one slot 39 is formed on a receiving end 32 of the second frame section 26, such that when the first and the second frame sections 26 are serially connected, the at least one tab 38 can extend into the at least one slot 39 thereby interlocking the first and second frame sections 26 and minimizing relative movement and rotation between the frame sections 26.

Figure 9:
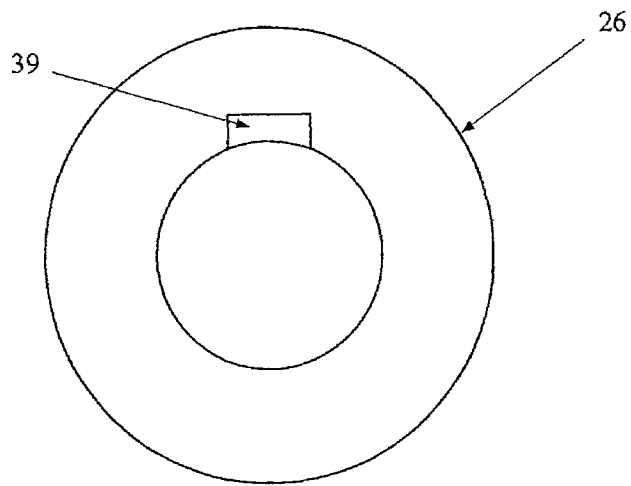
FIG. 9 is a cross sectional view of two frame sections assembled by an interlock according to an embodiment of the airborne EM system.
Figure 9:
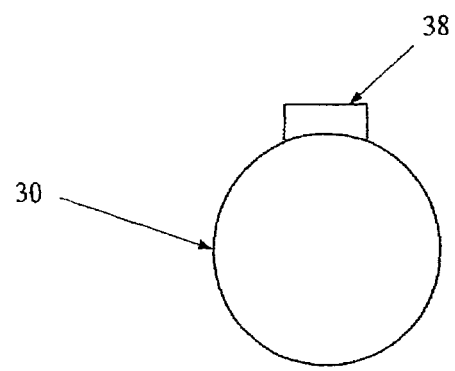

Alternatively, as shown by the cross-sections of the connected frame sections 26 in FIG. 9, one or more tabs 38 may take the form of one or more longitudinal ribs extending along the length of the connecting section 30 of the first frame section 26 or a portion thereof; whereas one or more slots 39 may take the form of one or more corresponding grooves inside the receiving end 32 of the second frame section 26 and extending along the length of the receiving end 32 of the second frame section 26 or a portion thereof, wherein when the connecting section 30 is inserted into the receiving end 32, the one or more tabs 38 extend into one or more slots 39 thereby interlocking the connected first and second frame sections 26.

Other interlocking devices that can be used include but are not limited to: projection/cavity, screws, latches, and any other similar apparatus.

Furthermore, the mechanism for eliminating relative movement and rotation between adjacent frame sections 26 described herein can be provided by frictionally engaged structures or means.

Figure 10:
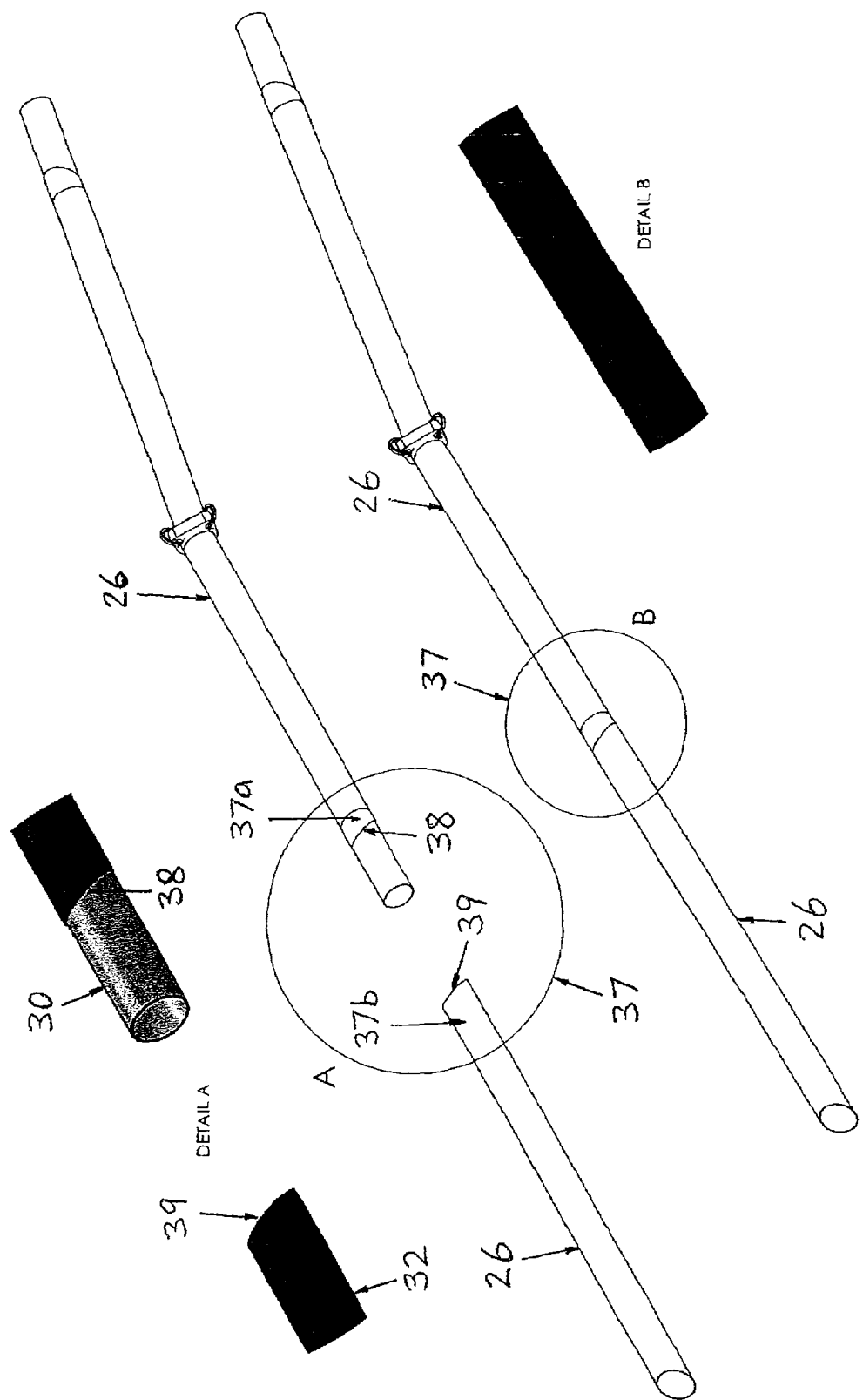
FIG. 10 is a perspective view of two frame sections assembled by an interlock according to an embodiment of the airborne EM system.

For example, in one embodiment shown in FIG. 10, an interlock 37 comprises a first member 37a disposed on a first frame section 26 and a second member 37b disposed on a second frame section 26 that is adjacent to the first frame section 26. The first member 37a is disposed near a connecting section 30 of the first frame section 26, and the second member 37b is disposed on a receiving end 32 of the second frame section 26, such that when the first and the second frame sections 26 are serially connected, at least a portion of the first member 37a frictionally engages with at least a portion of the second member 37b thereby interlocking the first and second frame sections 26 and minimizing relative movement and rotation between the first and second frame sections 26.

According to one embodiment illustrated in FIG. 10, the first member 37a comprises a first slanted portion 38 disposed near a connecting section 30 of the first frame section 26, and the second member 37b comprises a second slanted portion 39 extending from a receiving end 32 of the second frame section 26, such that when the first and the second frame sections 26 are serially connected, at least a portion of the first slanted portion 38 frictionally engages with at least a portion of the second slanted portion 39 thereby minimizing relative movement and rotation between the first and the second frame sections 26.

Advantageously, the interlocking mechanism described herein may substantially minimize relative movements and rotations between the connected frame sections 26. This in turn improves the planar rigidity and stability, and thereby minimizes the distortion of the shape of the transmitter frame 24 as the size of the transmitter frame 24 increases.

The generally rigid, light weight and modular transmitter frame described herein therefore provides stable support for large transmitter loop and will maintain its rigidity and stability as the size of the transmitter loop varies. As the fastening means 36 are used only at a limited number of locations around the connecting sections 30 of the transmitter frame 24, the added weight of the fastening means are negligible in practice. Using the generally rigid transmitter frame described above, transmitter loop having diameter in excess of about 30 meters with a manageable overall weight of the structure not exceeding tow capacity can be achieved. Therefore, the rigid transmitter frame 24 significantly improves the mechanical agility of the tow assembly 2 of the airborne EM system.

Another advantage of the rigid transmitter frame 24 is that the load bearing capability around the connecting sections 30 can be enhanced by the fastening means 36. As such, it is now possible to support the transmitter platform including the transmitter driver 40 using the rigid transmitter frame 24.

In one embodiment, the transmitter driver 40 is located centrally at or centrally above the transmitter loop and is connected to the transmitter frame 24 using cross ropes 44 coupled at a plurality of connecting sections 30 along the transmitter frame 24. This frees up the real estate in the aircraft that usually is taken to house the transmitter driver 40.

In addition, in contrast with those prior art EM systems where the receiver is located at the center of the transmitter loop, the receiver section 50 of the present invention can be spaced away from the transmitter section 20, thus further improves the signal-to-noise ratio of the airborne EM system.

The receiver section 50 generally comprises one or more receivers and associated support structures for mounting the receivers. A receiver generally comprises at least one receiver coil of any kind that is suitable for sensing the secondary fields induced in the subsurface of the ground.

The transmitter section 20 and receiver section 50 may cooperate with each other during flight in any suitable configuration. For example, they can be configured to cooperate in a spaced apart relationship. Depending on the surveying tasks, system load capacity, and the availability of operating space, they can also be deployed in relatively close proximity, or substantially co-located or supported by common supporting means.

Preferably, the receiver section 50 is positioned above or below the transmitter section 20, and is offset from the center of the transmitter section 20. However, it is to be understood that the spacing between the transmitter section 20 and the receiver section 50 can also be maintained by a concentric configuration, or in a coplanar fashion. For example, in one embodiment, the receiver section 50 is positioned above the generally rigid transmitter frame 24 and in between the aircraft and the transmitter frame 24.

In one embodiment, the receiver section 50 is located at the center of the transmitter frame 24. The transmitter driver 40 can be co-located with the receiver section 50 or can be placed at a different location. In case the receiver section 50 and the transmitter driver 40 are both located at the center of the transmitter loop, it is preferable that a transmitter platform rope is used to support the transmitter driver 40 from the tow assembly 4 to maintain the planar stability of the transmitter loop.

In some embodiments, flexible means, such as tow ropes, tension cables can be used to connect the transmitter section 20 and the receiver section 50. Alternatively, the transmitter section 20 is connected or coupled to the receiver section 50 by rigid means such as connecting rods, bars, struts or other similar structures. Any other rigid, semi-rigid or flexible connections can also be used to provide the spacing or association between the transmitter section 20 and the receiver section 50.

The transmitter frame 24 is supported by a cone, or shroud, comprised of a plurality of suspension means, for example, suspension ropes 4, each being connected to a suspension position along the circumference of the transmitter frame 24, and suspended from a main suspension location above the transmitter frame 24. The rope length has been designed to allow the transmitter frame 24 to fly horizontally leveled in forward flight. For this flight dynamic, the ropes are shorter at the forward side of the transmitter frame 24, and longer at the tail end of the transmitter loop.

In one embodiment, at least one suspension rope 4 is split at a split point into two legs forming a reversed Y-shaped suspension rope as the suspension rope 4 approaches the suspension position along the transmitter frame 24, wherein each of the two ends of the Y-shaped ropes (not shown) is connected to a connector means 42 disposed along the transmitter frame 24. The two legs of a Y-rope may have the same length or may have different lengths. This type of Y-shaped suspension arrangement allows the Y-ropes to adjust to the flight angle set by the suspension ropes 4. Advantageously, as each Y-rope connects to two suspension positions of the transmitter loop from a split point that is lower than the main suspension location, the Y-rope arrangement reduces the number of ropes required to connect to the main suspension position for towing the transmitter frame 24 while providing a balanced suspension of the transmitter loop at the same time, thereby reducing the drag created by the suspension means and enhancing the planar stability of the transmitter loop.

Although the present invention has been described in considerable detail with reference to certain preferred embodiments thereof, other embodiments and modifications are possible. Therefore, the scope of the appended claims should not be limited by the preferred embodiments set forth in the examples, but should be given the broadest interpretation consistent with the description as a whole.

What is claimed is:

1. An airborne electromagnetic surveying system comprising:
   a tow assembly connected to an aircraft, the tow assembly further comprising:
   a transmitter section comprising:
   a transmitter coil for generating a primary electromagnetic field that induces a secondary electromagnetic field, and
   a generally rigid transmitter frame for supporting the transmitter coil, the transmitter frame comprising a plurality of fixedly connected frame sections assembled in a way such that the generally rigid transmitter frame substantially retains its shape during operation; and
   a receiver section for detecting the secondary electromagnetic field,
   wherein a first frame section has an elongated section and a connecting section connected to the elongated section,
   a second frame section has a receiving section,
   the connecting section is sized to fit tightly inside the receiving section to prevent rotation of the first frame section relative to the second frame section,
   the first frame section has a tab on the connecting section,
   the second frame section has a slot on the receiving section, and
   the tab extends into the slot after the connecting section enters inside the receiving section for assembling the first and second frame sections.

2. The airborne electromagnetic surveying system of claim 1, wherein the receiver section is located above the generally rigid transmitter frame in between the aircraft and the generally rigid transmitter frame.

3. The airborne electromagnetic surveying system of claim 1, wherein the receiver section is located at the center of the generally rigid transmitter frame.

4. The airborne electromagnetic surveying system of claim 1, wherein the plurality of frame sections are connected using fastening means to substantially eliminate or minimize relative movements therebetween.

5. The airborne electromagnetic surveying system of claim 1, wherein when the first and the second frame sections are connected, the tab and the slot engage with each other to substantially eliminate or minimize relative movements or rotations between the first and the second frame sections.

6. The airborne electromagnetic surveying system of claim 1, wherein the generally rigid transmitter frame has a diameter in excess of 30 meters.

7. The airborne electromagnetic surveying system of claim 1, wherein the plurality of frame sections are serially connected to form the generally rigid transmitter frame.

8. The airborne electromagnetic surveying system of claim 1, wherein the frame sections are connected in a manner that substantially eliminates the relative rotation therebetween, thereby preventing distortion of the shape of the transmitter frame during operation.

9. The airborne electromagnetic surveying system of claim 1, wherein the generally rigid transmitter frame is constructed using lightweight materials.

10. A transmitter section for an airborne electromagnetic survey system, comprising:
    a transmitter coil, and
    a generally rigid transmitter frame for supporting the transmitter coil, the transmitter frame comprising a plurality of fixedly connected frame sections assembled in a way such that the generally rigid transmitter frame substantially retains its shape during operation,
    wherein a first frame section has an elongated section and a connecting section connected to the elongated section,
    a second frame section has a receiving section, the connecting section is sized to fit tightly inside the receiving section to prevent rotation of the first frame section relative to the second frame section, the first frame section has a first interlocking member on the connecting section, the second frame section has a second interlocking member on the receiving section, and the first interlocking member frictionally engages with the second interlocking member after the connecting section enters inside the receiving section for assembling the first and second frame sections.

\* \* \* \* \*